US010625185B1

(12) United States Patent
Grice

(10) Patent No.: US 10,625,185 B1
(45) Date of Patent: Apr. 21, 2020

(54) PORTABLE FILTRATION APPARATUS, SYSTEMS AND METHODS

(71) Applicant: PRECISION DEWATERING, LLC, Coral Gables, FL (US)

(72) Inventor: Steven Grice, Eau Claire, WI (US)

(73) Assignee: Precision Dewatering, LLC, Coral Gables, FL (US)

( * ) Notice: Subject to any disclaimer, the term of this patent is extended or adjusted under 35 U.S.C. 154(b) by 0 days.

(21) Appl. No.: 16/290,038

(22) Filed: Mar. 1, 2019

(51) Int. Cl.
   *B01D 29/27* (2006.01)
   *B01D 29/96* (2006.01)

(52) U.S. Cl.
   CPC ............ *B01D 29/27* (2013.01); *B01D 29/96* (2013.01); *B01D 2201/10* (2013.01); *B01D 2201/26* (2013.01)

(58) Field of Classification Search
   None
   See application file for complete search history.

(56) References Cited

U.S. PATENT DOCUMENTS

| | | | | |
|---|---|---|---|---|
| 499,757 A * | 6/1893 | Seeberger | ................. | A01K 3/00 119/502 |
| 1,331,239 A * | 2/1920 | Cartwright | ................. | E03F 7/10 210/241 |
| 1,631,118 A * | 6/1927 | Burkart | ................. | B62D 33/0207 296/43 |
| 2,206,074 A * | 7/1940 | Brick | ................. | B62D 33/023 296/35.1 |
| 2,751,248 A * | 6/1956 | Kritser | ................. | B62D 33/0207 296/43 |
| 3,159,420 A * | 12/1964 | McCrossen | ................. | B60R 13/01 296/183.1 |
| 3,348,689 A * | 10/1967 | Kraissl, Jr. | ................. | B01D 29/33 210/238 |
| 3,365,230 A * | 1/1968 | Langdon | ................. | B62D 33/08 296/3 |
| 4,119,534 A * | 10/1978 | Porter | ................. | B07B 1/22 209/291 |

(Continued)

FOREIGN PATENT DOCUMENTS

GB   2350045 A * 11/2000  ........... A01K 15/027

OTHER PUBLICATIONS

Coachella Valley Trading Company, Oil & Sediment Model. 3' × 4', https://cotradeco.com/products/1991-dewatering-bags-standard 9729-OS.

(Continued)

*Primary Examiner* — Robert J Popovics
(74) *Attorney, Agent, or Firm* — Anthony J. Bourget

(57) ABSTRACT

Methods, apparatuses and systems for filtering dewatered water utilizing primary and secondary containment mechanisms positioned on a portable sled, the primary containment mechanism of the system being a filter bag enclosed by an interior porous fence, the secondary containment mechanism including a filter medium positioned within a channel defined by the interior fence and an exterior porous fence and enclosing the filter bag. Water entering the filter bag exits the bag as filtrate which passes through the secondary containment mechanism and returns to the environment. The system is transported to a different location where filtering may continue utilizing the same filter bag enclosed within the interior fence.

23 Claims, 13 Drawing Sheets

(56) References Cited

U.S. PATENT DOCUMENTS

| | | | | |
|---|---|---|---|---|
| 4,333,835 A * | 6/1982 | Lynch | B01D 17/00 | 210/305 |
| 4,449,847 A * | 5/1984 | Scales | E02B 3/127 | 405/17 |
| 4,473,978 A * | 10/1984 | Wood | A01C 3/02 | 264/31 |
| 4,474,404 A * | 10/1984 | Hagenbuch | B60P 1/286 | 266/165 |
| 4,483,640 A * | 11/1984 | Berger | E02D 29/0208 | 210/170.03 |
| 4,487,227 A * | 12/1984 | Meissner | B01D 29/54 | 138/103 |
| 4,518,507 A * | 5/1985 | Conner | B09B 1/00 | 141/114 |
| 4,530,622 A * | 7/1985 | Mercer | E02B 3/066 | 405/284 |
| 4,543,181 A * | 9/1985 | Greenwood | B01D 29/945 | 209/273 |
| 4,756,033 A * | 7/1988 | Schelfhorst | B65D 88/08 | 4/488 |
| 4,765,775 A * | 8/1988 | Kroger | B65D 90/24 | 405/129.8 |
| 4,807,373 A * | 2/1989 | Sloan | E02F 3/88 | 210/170.04 |
| 4,821,679 A * | 4/1989 | Hackert | A01K 3/00 | 119/502 |
| 4,854,058 A * | 8/1989 | Sloan | E02F 3/88 | 37/323 |
| 4,871,454 A | 10/1989 | Lott | | |
| 4,929,353 A | 5/1990 | Harris | | |
| 5,024,346 A * | 6/1991 | Roser | B65D 77/0453 | 220/9.1 |
| D320,839 S * | 10/1991 | Froud | | D23/209 |
| 5,054,961 A * | 10/1991 | Sherman | B09C 1/00 | 405/128.15 |
| 5,098,364 A | 3/1992 | Schilling | | |
| 5,110,005 A * | 5/1992 | Schilling | B31B 70/00 | 206/554 |
| 5,114,274 A * | 5/1992 | Heiler, Jr. | B09B 1/00 | 405/129.7 |
| 5,154,827 A * | 10/1992 | Ashelin | B01D 63/061 | 210/490 |
| 5,156,749 A * | 10/1992 | Williams | B01D 29/01 | 209/404 |
| 5,183,086 A * | 2/1993 | Fanta | B65D 90/046 | 141/10 |
| 5,333,970 A * | 8/1994 | Heselden | E02D 29/0208 | 405/286 |
| 5,403,474 A * | 4/1995 | Emery | E03F 1/00 | 210/163 |
| 5,454,195 A * | 10/1995 | Hallsten | B65D 90/24 | 220/495.01 |
| 5,480,254 A * | 1/1996 | Autry | E03F 5/0401 | 210/163 |
| 5,565,097 A * | 10/1996 | Hayday | B01D 29/15 | 210/167.31 |
| 5,573,349 A * | 11/1996 | Paoluccio | B01D 17/0202 | 210/170.03 |
| 5,589,081 A | 12/1996 | Harris | | |
| 5,595,654 A | 1/1997 | Caughman, Jr. | | |
| 5,605,416 A * | 2/1997 | Roach | E02B 3/02 | 405/21 |
| 5,614,092 A * | 3/1997 | Di Leo | B01D 29/23 | 210/350 |
| 5,632,889 A * | 5/1997 | Tharp | B01D 17/0202 | 210/165 |
| 5,636,938 A * | 6/1997 | Ragazzo | E02B 3/127 | 405/15 |
| 5,647,695 A * | 7/1997 | Hilfiker | E01F 8/025 | 405/258.1 |
| 5,681,460 A | 10/1997 | Caughman, Jr. | | |
| 5,707,535 A * | 1/1998 | Harris | B01D 29/23 | 210/804 |
| 5,776,567 A * | 7/1998 | Schilling | B01D 29/23 | 428/34.5 |
| 5,803,531 A * | 9/1998 | Nielsen | B60R 13/01 | 105/422 |
| 5,810,510 A * | 9/1998 | Urriola | E02B 11/005 | 405/45 |
| 5,858,226 A | 1/1999 | Caughman, Jr. | | |
| 5,882,142 A * | 3/1999 | Siglin | E02D 29/14 | 405/52 |
| 5,887,932 A * | 3/1999 | Pier, II | B60P 3/04 | 296/24.31 |
| 5,948,250 A * | 9/1999 | Middleton | C02F 1/40 | 210/232 |
| 5,958,226 A * | 9/1999 | Fleischmann | B01D 29/055 | 210/165 |
| 6,004,461 A * | 12/1999 | Harris | B01D 29/23 | 210/241 |
| 6,059,964 A * | 5/2000 | Strawser, Sr. | E03F 1/00 | 210/164 |
| 6,059,966 A * | 5/2000 | Brandhofer | B01D 25/02 | 210/232 |
| 6,096,228 A * | 8/2000 | Angelle | B01D 21/0096 | 210/803 |
| 6,135,293 A * | 10/2000 | Herbst | B01D 29/824 | 210/351 |
| 6,146,528 A | 11/2000 | Caughman, Jr. et al. | | |
| 6,146,540 A * | 11/2000 | Nakamura | B01D 29/093 | 210/745 |
| 6,217,757 B1 * | 4/2001 | Fleischmann | B01D 24/08 | 210/163 |
| 6,258,268 B1 * | 7/2001 | Lake | B01D 29/35 | 210/238 |
| 6,281,001 B1 * | 8/2001 | McNelly | C05F 17/964 | 435/262 |
| 6,322,704 B1 * | 11/2001 | Martin | B01D 24/08 | 210/661 |
| 6,364,122 B1 * | 4/2002 | Massey | B01D 29/35 | 210/455 |
| 6,368,017 B2 * | 4/2002 | Black | E02D 29/0208 | 210/170.03 |
| 6,464,428 B1 * | 10/2002 | Mikell | E02B 3/126 | 405/15 |
| 6,533,941 B2 * | 3/2003 | Butler | B01D 24/008 | 210/163 |
| 6,547,493 B2 * | 4/2003 | Spangler | E02B 3/04 | 405/302.6 |
| 6,562,233 B1 * | 5/2003 | Schilling | B01D 29/23 | 210/164 |
| 6,572,314 B2 * | 6/2003 | French | B62D 29/008 | 410/121 |
| 6,645,373 B2 * | 11/2003 | Gruca | B01D 17/0202 | 210/315 |
| 6,712,976 B2 * | 3/2004 | Manzone | B01D 39/04 | 210/668 |
| 6,793,811 B1 * | 9/2004 | Fleischmann | E03F 1/00 | 210/163 |
| 6,835,314 B2 * | 12/2004 | Keller | B01D 29/27 | 210/710 |
| 6,852,232 B2 * | 2/2005 | Martin | B01D 24/08 | 210/661 |
| 6,863,807 B2 * | 3/2005 | Crawford, III | E02B 8/02 | 210/170.09 |
| 6,872,029 B2 * | 3/2005 | Allard | B01D 29/27 | 405/36 |
| 7,125,823 B2 * | 10/2006 | Manzone | B01D 39/04 | 502/402 |
| 7,179,377 B1 * | 2/2007 | Caughman, Jr. | B01D 29/05 | 210/232 |
| 7,186,333 B2 * | 3/2007 | Kluge | E03F 1/00 | 210/164 |
| 7,229,559 B2 * | 6/2007 | Manzone | B01D 39/04 | 210/263 |
| 7,237,510 B2 * | 7/2007 | White | A61D 3/00 | 119/512 |

(56) References Cited

U.S. PATENT DOCUMENTS

| | | | | |
|---|---|---|---|---|
| 7,410,576 | B2* | 8/2008 | Brouillard | B01D 29/23 210/241 |
| 7,449,105 | B2* | 11/2008 | Hastings | E02D 29/0291 210/170.03 |
| 7,454,847 | B1* | 11/2008 | Miller | F26B 5/14 34/397 |
| 7,509,759 | B2* | 3/2009 | Langdon | B01D 21/00 37/307 |
| 7,614,825 | B2* | 11/2009 | Kroger | B65D 90/24 220/476 |
| 7,670,082 | B2* | 3/2010 | Olsta | E02D 29/0208 405/129.75 |
| 7,691,526 | B2* | 4/2010 | Frazier | G01M 3/186 429/100 |
| 7,771,591 | B2* | 8/2010 | Lucas | E03F 1/00 210/163 |
| 7,799,235 | B2* | 9/2010 | Olson | B01D 29/15 210/162 |
| 7,820,045 | B2* | 10/2010 | Caughman, Jr. | B01D 29/23 210/232 |
| 7,837,875 | B2* | 11/2010 | Callaert | B01D 29/15 210/232 |
| 7,943,051 | B2 | 5/2011 | Dieziger | |
| 7,959,799 | B2* | 6/2011 | Happel | B01D 21/0012 210/163 |
| 8,012,346 | B2* | 9/2011 | Peters, Jr. | C02F 1/004 210/163 |
| 8,070,960 | B2* | 12/2011 | Conwell | B01D 29/94 210/702 |
| 8,097,168 | B2* | 1/2012 | Theodore | A01G 33/00 210/724 |
| 8,101,070 | B2* | 1/2012 | Theodore | C02F 11/14 210/150 |
| 8,177,087 | B2* | 5/2012 | Noble | B08B 17/00 220/666 |
| 8,261,918 | B1* | 9/2012 | Powell | B01D 29/27 210/455 |
| 8,540,456 | B2* | 9/2013 | Marshall | B65D 90/24 405/107 |
| 8,636,445 | B1* | 1/2014 | Williams | B65D 90/24 220/9.4 |
| 8,640,901 | B2* | 2/2014 | Davis | E02B 3/106 220/1.6 |
| 8,689,501 | B2* | 4/2014 | Chamoux | E02D 31/004 52/173.1 |
| 8,764,976 | B2* | 7/2014 | Schreiber | C02F 3/08 210/151 |
| 8,764,990 | B1* | 7/2014 | Julian | B01D 29/13 210/248 |
| 8,910,593 | B2* | 12/2014 | Kell | A01K 1/0236 119/400 |
| 9,051,192 | B2* | 6/2015 | Kent | E03F 5/0404 |
| 9,175,465 | B2* | 11/2015 | Rinkenback | E03F 5/0407 |
| 9,586,754 | B1* | 3/2017 | Faacks | B65F 1/1415 |
| 9,611,626 | B2* | 4/2017 | Pettey | E02D 29/0208 |
| 9,623,456 | B2* | 4/2017 | Leblanc | B09C 1/002 |
| 9,795,903 | B2* | 10/2017 | Vickers | B01D 29/90 |
| 9,809,952 | B2* | 11/2017 | Wagner | B01D 21/2444 |
| 10,005,008 | B2* | 6/2018 | Dawson | B01D 21/10 |
| 10,022,656 | B2* | 7/2018 | Day | B01D 35/027 |
| 10,046,905 | B2* | 8/2018 | Downey | B65D 88/022 |
| 10,081,487 | B2* | 9/2018 | Southworth | E02D 5/24 |
| 10,099,160 | B2* | 10/2018 | Dawson | B01D 21/30 |
| 10,173,835 | B2* | 1/2019 | Lappeman | B65F 1/02 |
| 2002/0008071 | A1* | 1/2002 | Chinn | C02F 1/286 210/767 |
| 2003/0034286 | A1* | 2/2003 | Butler | B01D 24/008 210/163 |
| 2003/0062319 | A1* | 4/2003 | Keller | B01D 29/27 210/710 |
| 2003/0150396 | A1* | 8/2003 | White | A61D 3/00 119/512 |
| 2004/0079691 | A1* | 4/2004 | Jowett | E03F 11/00 210/220 |
| 2004/0083984 | A1* | 5/2004 | White | A61D 3/00 119/752 |
| 2005/0100401 | A1* | 5/2005 | Urriola | E01C 9/004 404/2 |
| 2005/0183997 | A1* | 8/2005 | Happel | B01D 21/0012 210/163 |
| 2005/0184000 | A1* | 8/2005 | Jowett | C02F 3/04 210/220 |
| 2005/0199537 | A1* | 9/2005 | Kluge | E03F 1/00 210/164 |
| 2006/0011561 | A1 | 1/2006 | Brouillard et al. | |
| 2006/0102565 | A1* | 5/2006 | Alford | C02F 11/128 210/770 |
| 2006/0162195 | A1* | 7/2006 | Langdon | B01D 21/00 37/466 |
| 2007/0034578 | A1* | 2/2007 | Brouillard | B01D 29/23 210/767 |
| 2007/0108117 | A1* | 5/2007 | Callaert | B01D 29/15 210/238 |
| 2007/0181197 | A1* | 8/2007 | Krichten | E03F 1/005 137/833 |
| 2008/0179240 | A1 | 7/2008 | Kauppi et al. | |
| 2009/0101553 | A1* | 4/2009 | Lucas | E03F 1/00 210/164 |
| 2009/0129866 | A1* | 5/2009 | Smallwood | E02B 3/127 405/16 |
| 2009/0175684 | A1* | 7/2009 | Barrett | B65D 90/205 405/52 |
| 2009/0266767 | A1* | 10/2009 | McInnis | C02F 1/42 210/688 |
| 2009/0314715 | A1 | 12/2009 | Conwell | |
| 2010/0186642 | A1* | 7/2010 | Christman | E01F 8/025 109/79 |
| 2010/0206817 | A1* | 8/2010 | Dieziger | B01D 21/0003 210/745 |
| 2010/0294730 | A1* | 11/2010 | Weston | B03B 9/063 210/767 |
| 2010/0300373 | A1* | 12/2010 | Kell | A01K 1/0236 119/512 |
| 2010/0303387 | A1* | 12/2010 | Dahlquist | B65D 81/022 383/3 |
| 2011/0056519 | A1* | 3/2011 | Card | B08B 17/00 134/10 |
| 2012/0137598 | A1* | 6/2012 | Chamoux | E02D 29/0208 52/173.1 |
| 2012/0204498 | A1* | 8/2012 | Richey | E02B 3/106 52/102 |
| 2012/0261414 | A1* | 10/2012 | Mann | B65D 88/74 220/62.21 |
| 2013/0186811 | A1* | 7/2013 | Kaiser | E03F 5/0404 210/163 |
| 2014/0238915 | A1* | 8/2014 | McInnis | E03F 5/0404 210/170.03 |
| 2016/0168837 | A1* | 6/2016 | Pettey | E02D 29/0208 210/170.03 |
| 2017/0326480 | A1* | 11/2017 | Day | B01D 29/05 |
| 2019/0283034 | A1* | 9/2019 | Berry | B02C 13/185 |

OTHER PUBLICATIONS

Rover Pipeline Project, Fig. 15 (Prior Art) and Fig. 16 (Prior Art), typical construction of filter bag applications implemented in the US prior to Mar. 1, 2018.

* cited by examiner

PORTABLE FILTRATION APPARATUS, SYSTEMS AND METHODS

BACKGROUND OF THE INVENTION

1. Field of the Invention

This invention relates to the field of filtering apparatuses, systems and methods, and more particularly to apparatuses, systems and methods for filtering of water at construction sites and other locations to be dewatered.

2. Background Information

Dewatering systems are utilized in various industrial areas and construction sites. Dewatering systems are meant to remove water from certain areas, for instance from a hole or pond located at a construction site. If rain water or other liquid happens to fill an area of a construction zone or even within structures or containers, the unwanted fluid is removed or the area is "dewatered." During a dewatering process particles or unwanted materials or sludge, fines, contaminants or the like are often mixed with the water or fluid. There are rules and regulations on how to handle such removed water so that the particulate matter or contaminants are not introduced or re-introduced into the removed water or sites. The water run-off may be dirty and contain unwanted particulate material or contaminants or pollution. In some cases regulations require the water to be filtered before it is returned to the location or to nearby waterways. In some instances a dewatering pond or holding basin is constructed around a filter bag for the purposes of dewatering a construction area. For instance, the dewatered water is introduced into a filter bag which is surrounded by a secondary containment structure. As the water exits the filter bag the sludge or dirt or other matter is captured inside the bag. The exiting water is further contained, at least partially, by the secondary containment mechanism. In some aspects the secondary containment mechanism includes a ring of straw bales, i.e., straw bales are placed end-to-end on the ground and encircling the filter bag. The water will pass through the secondary containment (where further filtering of the water may or may not transpire) and flow to surrounding or adjacent lands or waterways or ponds.

FIG. 15 and FIG. 16 depict one example of a prior art system. The management and construction of such systems are or can be very expensive, time consuming and only of limited or one-time use. Construction of the systems typically cause delay in construction, especially when constructing pipeline facilities. The planning and location of such systems also often require permits or approvals and a knowledge of the state, local and federal water runoff, pollution and dewatering regulations. Such systems are labor intensive, and costly, especially if mistakes are made or in the case of a faulty containment system.

While the foregoing are attempts to provide effective dewatering systems and have certain benefits, there is room for improvement.

SUMMARY OF THE INVENTION

In one aspect the invention pertains to a portable filtration system comprising a sled or apparatus upon which is positioned a filter bag to receive the dewatered water. The apparatus includes a secondary containment feature including filter medium and a porous exterior fence through which the water escapes and flows to the ground or waterway surrounding or adjacent the apparatus. The filter medium, such as straw bales or core logs, is contained in a channel defined in part by an interior porous fence and the exterior porous fence, and where the interior fence encloses the filter bag. In operation the dewatered water is supplied to the filter bag where a filtrate of the water exits the bag traveling through the porous interior fence, through the filter medium of the secondary contentment, and through the exterior fence. When the filter bag fills with material, the bag is replaced. The system includes hooks and lift mechanisms so that it may be easily transported from a first construction site to a second construction site for dewatering and filtering.

In a further aspect the invention includes a portable water filtration apparatus having a base, an exterior porous fence extending from the base and bounding a major internal area, and an interior porous fence extending from the base and bounding a minor internal area. The base, exterior fence and interior fence define a filter medium placement channel configured to receive a filter medium. The filter medium includes a straw bale or filter core log, for instance, and wraps around a filter bag positionable within the minor internal area and enclosed by the interior fence.

In a further aspect the invention includes a method of treating liquids including receiving liquid within a filter bag positioned upon a base within an interior fence of a portable sled, passing first filtrate from the bag through the interior fence and through a secondary containment channel having a filter medium to form a second filtrate, the second filtrate passing through an exterior porous fence connected to the portable sled. In further aspects the method includes transporting the portable sled from a first construction site location to a second construction site location while the filter bag is retained within the interior fence.

The above partial summary of the present invention is not intended to describe each illustrated embodiment, aspect, or every implementation of the present invention. The figures and detailed description and claims that follow more particularly exemplify these and other embodiments and further aspects of the invention.

Figure 1:
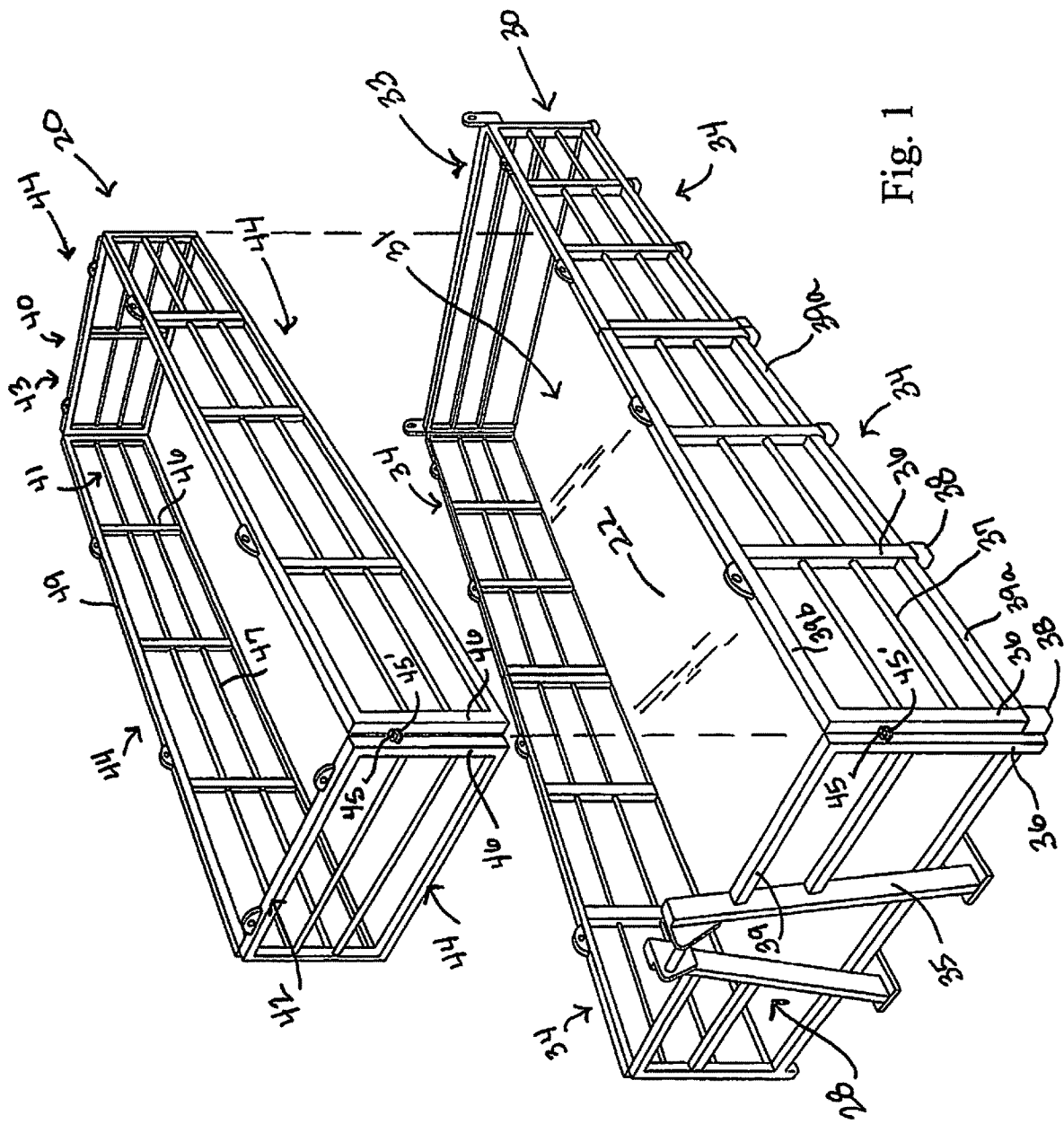
FIG. 1 is an exploded perspective view of an apparatus made in accordance with one aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-14, aspects of the apparatuses, systems and methods are shown. FIG. 1 is an exploded perspective view of one aspect of an apparatus or portable sled 20 in accordance with the invention. Apparatus or portable sled 20 includes a base 22 upon which is connected an exterior fence 30. Exterior fence 30 bounds a major internal area 31. An interior fence 40 is configured to be positioned within fence 30 at the major internal area 31. Interior fence 40 bounds a minor internal area 41. In this aspect base 22 includes a rectangular planar structure with fence 30 positioned around a perimeter of the base 22. Fence 30, or a portion of fence 30 is removable from base 22. In one aspect sled 20 includes a front fence segment 32 which is rigidly connected to base 22 and is not removable. Fence 30 includes a series of external fence segments 34 which in one aspect are removably attached to base 22. In one aspect segments 34 have posts 36 which insert into sockets 38. The sockets 38 are mounted to base 22 using gussets or other securing structure. The sockets 38 include a through hole 38' into which securing bolts may be inserted to secure the posts 36 into position. Matching through holes are included within the posts 36 for securing the posts with the bolts in the sockets 38. In alternatives the segments 34 may be welded or permanently secured to base 22. In one aspect exterior fence 30 and segments 34 include horizontal structures, such as slats or rods or rungs 37 which span between respective posts 36. Fence 30 and segments 34 in one aspect also include bottom rails 39 and top rails 39. The posts 36, rungs 37 and rails 39 form a porous fence structure or segments 34. Segments 34 have sufficient structure to hold filter media (described below) while also allowing liquids such as water to pass therethrough. Different types or configurations of fence structures may be used, provided there is sufficient space to allow liquids to pass through the segments 34. In the example, segments 34 are made of metal, such as steel or other metals. Other materials may also be used to create segments 34.

Sled 20 includes an interior fence 40 positioned upon base 22 and within the major internal area 31. Interior fence 40 bounds a minor internal area 41. Fence 40 includes interior fence segments 44 which connect together in a generally rectangular configuration. In one aspect interior fence segments 44 include posts 46 and rungs 47 and rails 49 to create a porous fence-like structure. Fence segments 44 have sufficient structure to hold filter media (described below) while also allowing liquids such as water to pass through the segments 44. Different types of fence structures may be used. In the example, segments 44 are made of metal, such as steel or other metals. Other materials may also be used to create segments 44. In one aspect fence segments 44 include ears 45, 45' connected to adjacent posts 46. Ears 45, 45' overlap such that a hitch pin inserts into a hole aligned through the layered ears 45, 45'. The hitch pin secures adjacent segments 44 together. In one aspect a set of ears 45, 45' may be positioned at an upper portion of adjacent segments 44, and another set of ears 45, 45' (or still further sets) are positioned at a lower portion of the adjacent segments 44 for a stable connection. Ears 45 are made of metal and welded to posts 46 in one example. With hitch pins secured through all sets of ears 45, 45' of adjacent segments 44, fence 40 is a stand-alone structure which may be picked and placed upon sled 20. Fence 40 is free to slide about the major internal area 31. Fence 40 may also be assembled into position upon sled 20 by connecting adjacent segments 44 with respective hitch pins through ears 45, 45'. In one aspect fence 40 has an open top and bottom. The same or similar ears 45, 45' are and can be connected to posts 36 of exterior fence 30. Specifically, adjacent segments 34 include respective ears 45 which receive hitch pins secured through holes within the overlapped ears 45, 45'.

Figure 2:
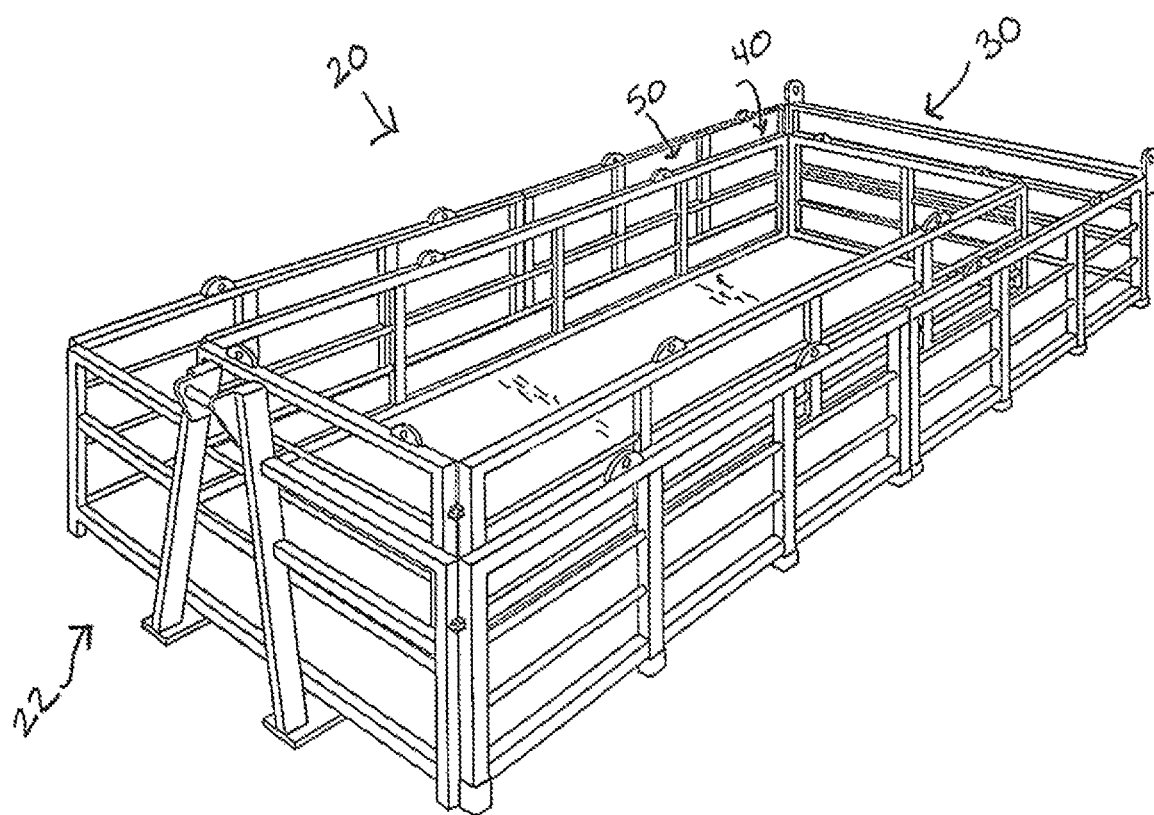
FIG. 2 is a front perspective view of the apparatus shown in FIG. 1 with components combined.
Figure 3:
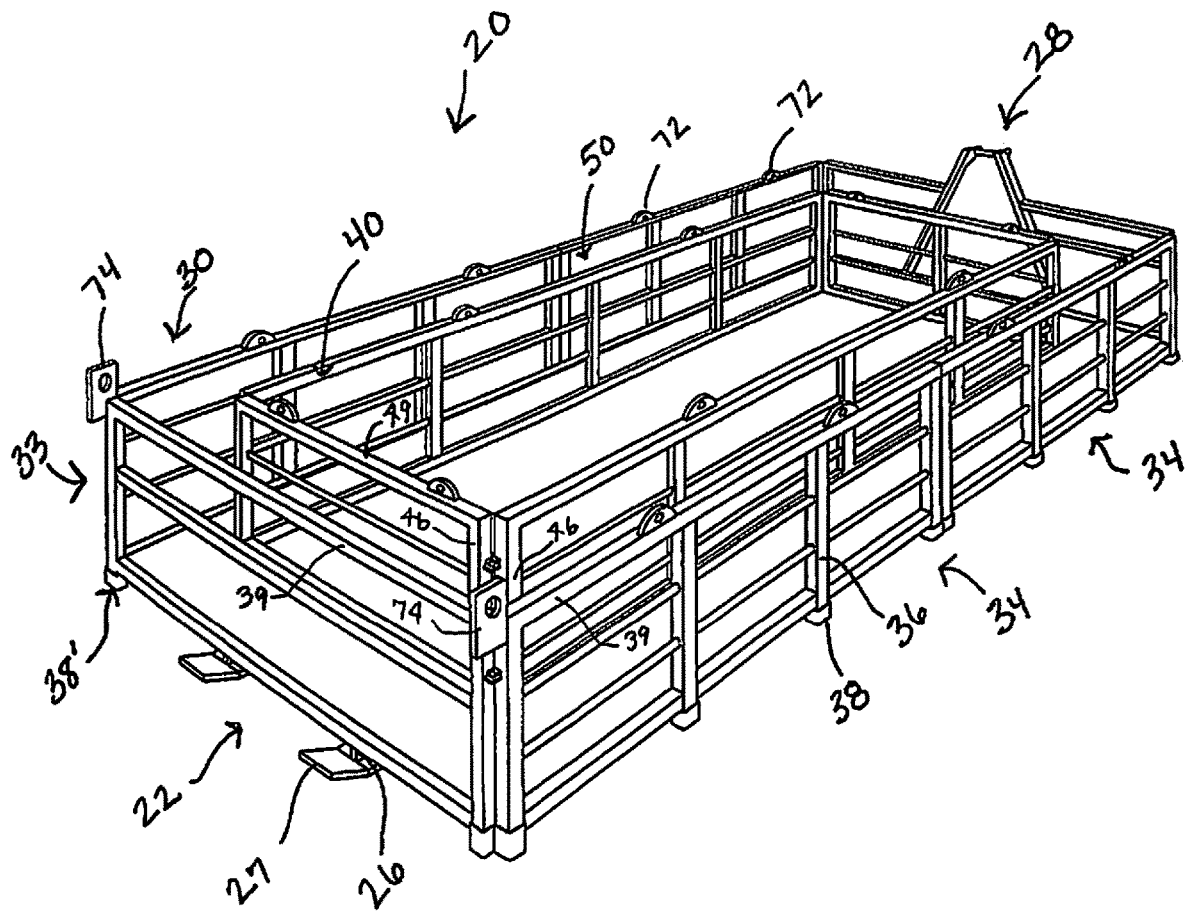
FIG. 3 is a rear perspective view of the apparatus shown in FIG. 2.
Figure 4:
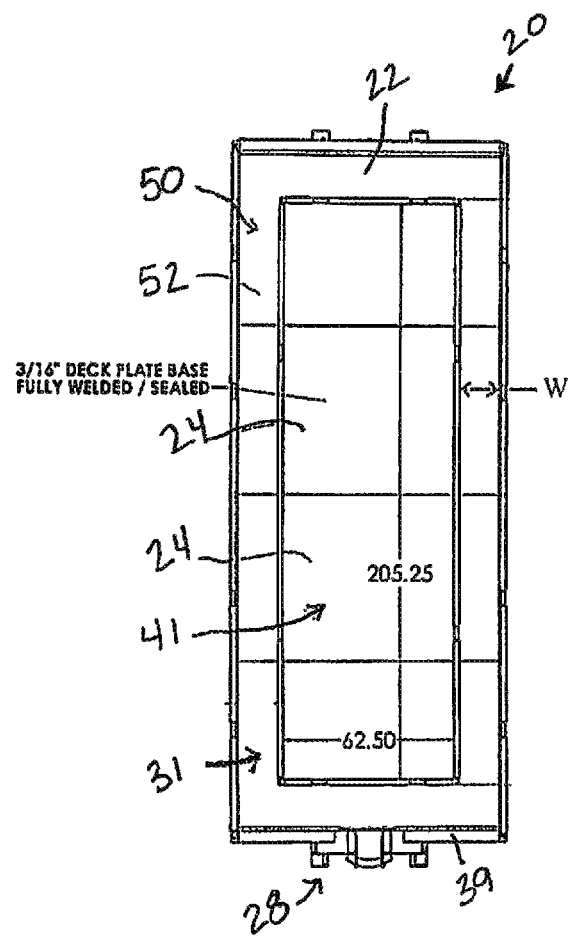
FIG. 4 is a top view of the apparatus shown in FIG. 2.

FIG. 2 and FIG. 3 show perspective views of the apparatus or sled 20. Fence 40 is shown positioned upon base 22 within fence 30. Fence 40, base 22 and fence 30 define a channel 50. Channel 50 is a filter medium placement channel configured to receive a filter medium 60. In one aspect fence 40 is set upon or rests by gravity upon base 22. In this manner fence 40 is free to be repositioned about base 22 within major internal area 31 and may slide or be slid upon base 22. In other aspects fence 40 is secured to base 22 and/or to fence 30; however, such securing is not always necessary or desired. Having fence 40 unsecured and simply resting upon base 22 allows for ease in placement of filter media 60 within the channel 50 as described below. In one aspect fence 40 is configured such that the channel 50 forms a margin 52 around or about the base 22. The margin 52 has a footprint or area corresponding to the width between fence 30 and fence 40. As shown in FIG. 4, the margin 52 of channel 50 is generally rectangular shaped and is positioned at the perimeter or along the perimeter of base 22. In one aspect fence 40 is configured such that the channel 50 has a width "W" which is uniform or substantially uniform throughout the entire margin 52. In one aspect the width "W" is uniform throughout the channel 50 as channel 50 spans a length of sled 20 and as channel 50 spans a width of the sled 20. Such uniform width W accommodates for efficient insertion of filter medium 60 noted below.

FIG. 4 shows base 22 which provides a sealed foundation for securing fence 30. In one aspect base 22 is comprised of metal base segments 24 which in one aspect are welded together and sealed. In one aspect four steel segments 24 comprise base 22. Base 22 is sealed such that water is not able to pass through base 22. Sockets 28 are attached at a perimeter of base 22 for holding segments 34 of fence 30. In one aspect the sockets 28 are welded to and extend from the base 22. The sockets 28 in one aspect hang off a perimeter edge of the base 22. Front segment 32 is permanently connected to base 22.

Figure 5:
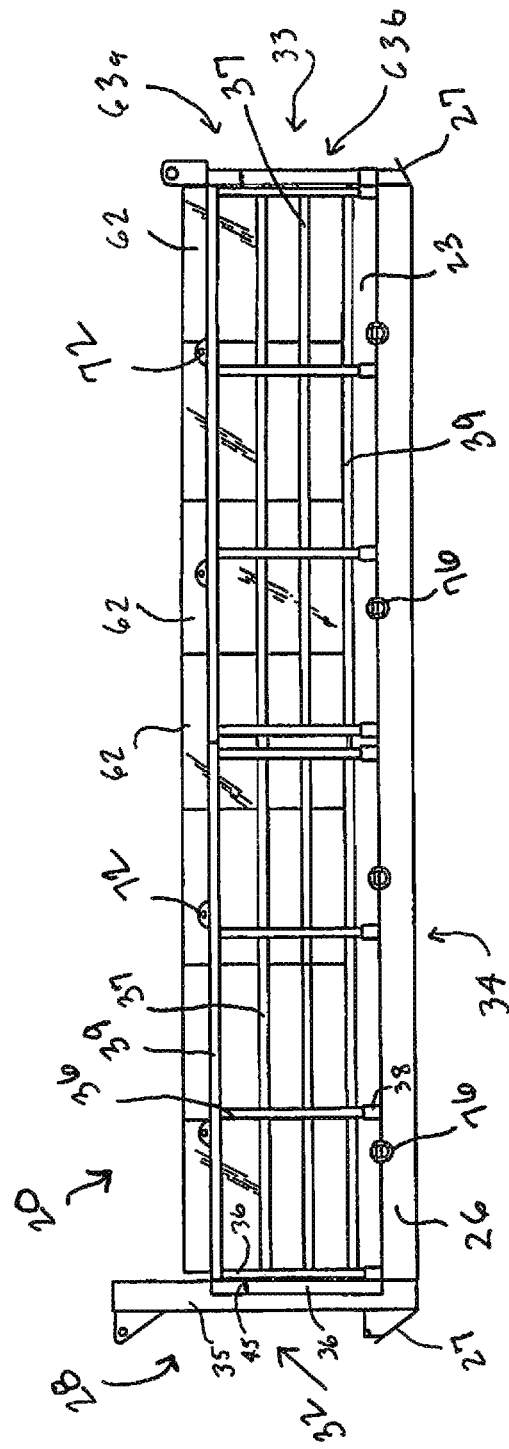
FIG. 5 is a right side view of the apparatus of FIG. 2 and containing filter medium.
Figure 6:
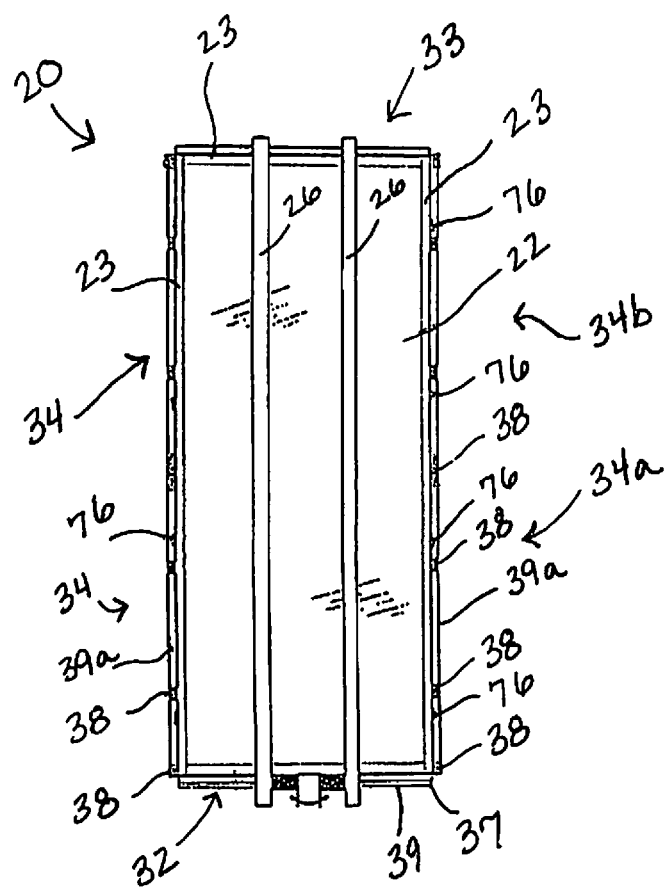
FIG. 6 is a bottom view of the apparatus of FIG. 2.

FIG. 5 is a right side view of sled 20 and FIG. 6 is a bottom view of sled 20. FIGS. 5 and 6 show sled 20 having skids 26 positioned below base 22. Skids 26 provide structural support to sled 20 and also allow sled 20 to slide upon the ground or other surface. Skids 26 include angled feet 27 to provide ease of sliding. Rollers may also be connected to skids or to the base 22 to allow for roll-off delivery and pickup of sled 20. A lift tongue 28 is provided at front segment 32 to accommodate lifting of sled via a hydraulic arm. A hydraulic arm is received at tongue 28 for lifting as is commonly accomplished in the lifting of dumpsters and other equipment having the same or similar tongue 28. Other lifting structures may also be used at front segment 32. Front segment 32 includes angled struts 35 and rails 39 and posts and rungs for structural support. A bottom side of sled 20 shown in FIG. 6 shows sockets 28 connected to base 22 with segments 34 positioned at the perimeter of sled having posts 36 inserted into socket 28. In the example shown (FIG. 5), segment 34a includes four posts which insert into four respective sockets 28. Bottom rail 39a (FIG. 6) is shown spanning between adjacent sockets 28. Another segment 34b also includes four posts inserted into four respective sockets 28 and aligned adjacent first segment 34a. Additional segments 34 and back segment 33 are inserted into the opposite side of the sled 20 as shown in FIG. 6 to create fence 30. In one aspect base 22 includes base rails 23 which outline a perimeter of base. The base rails 23 extend downward from and are welded to base segments 24. The sockets 38 are welded to base rails 23 in one aspect. Lift rings 76 are also attached or welded to base rails 23 at various points about the perimeter of base. The lift rings allow for connection to a cable or other mechanism for transport of sled 20 such as by sliding or lifting. The angled struts 35 of front segment 32 are connected or welded to base rail 23.

Figure 7:
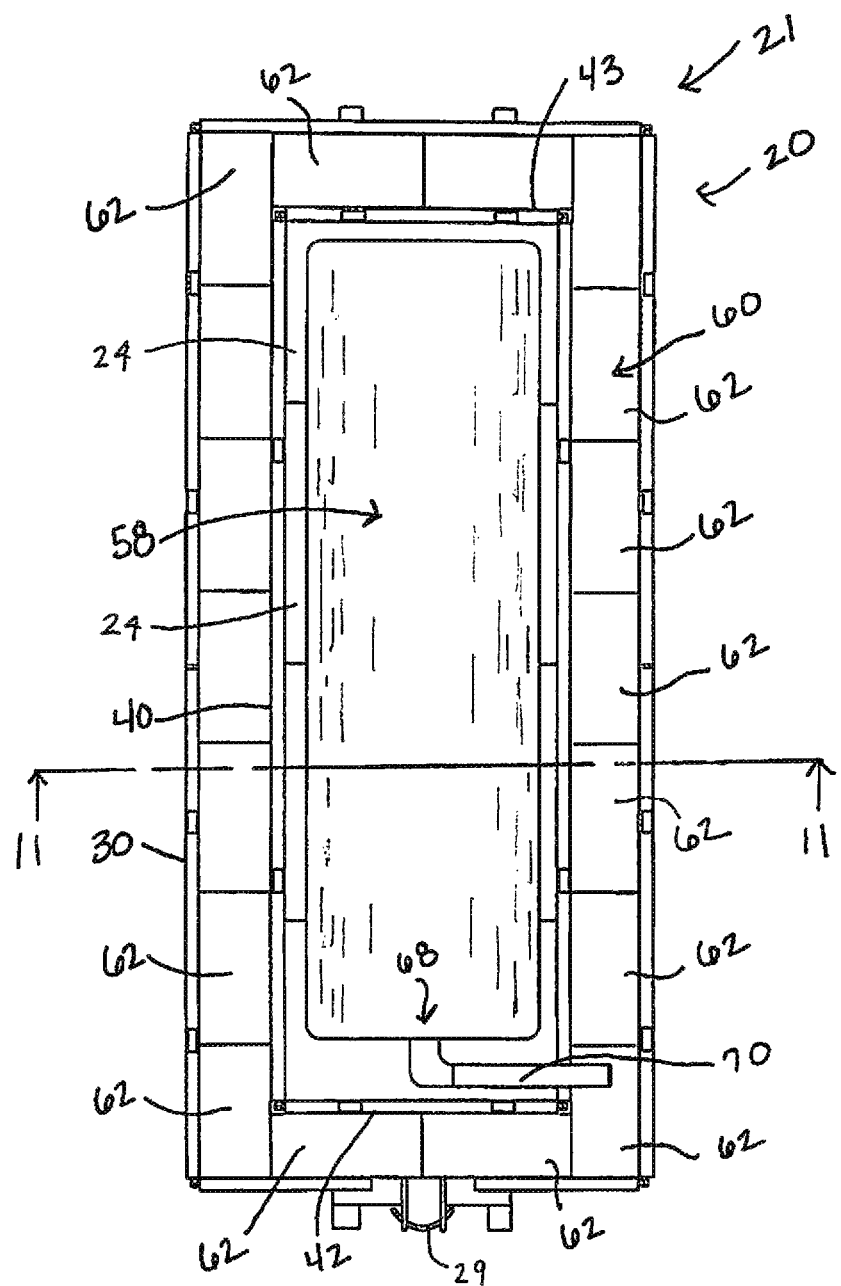
FIG. 7 is a top view the apparatus of FIG. 2 and of a system aspect in accordance with the present invention.

FIG. 7 is a top view of a system 21 aspect of the invention. System 21 also depicts partial operation of a method of treating liquids. System 21 includes sled 20 in which is positioned a filter bag 58. Filter bag 58 is made of a filter material formed into a shape of a bag as is commonly used in dewatering operations. Bag 58 includes an inlet 68 into which piping 70 or a tube is inserted to supply liquids, such as water or dirty water having silt and/or particles and/or other materials to be separated or filtered from the liquid/water. As shown in FIG. 7, bag 58 is positioned within interior fence 40 and minor internal area 41. Filter bag 58 is constructed and situated such that it does not contact fence 40. The piping 70 connects to inlet 68 and runs outward from sled 20 to a supply. The supply may include a water source and a pump. The water source is typically the water to be removed from a construction site or other area, such as a pond or puddles or other pooled water. The water is removed so that work may be accomplished at the site. Removal of the water often results in removal of water containing sediments or particles which are to be filtered before the water is returned to the construction site or other areas.

Also shown in FIG. 7 is filter medium 60, such as straw bales 62. Filter medium 60 or straw bales 62 in this aspect are inserted into channel 50 which surrounds filter bag 58. In the example shown in FIG. 7, two columns of 7 bales and two rows of two bales are depicted.

Figure 8:
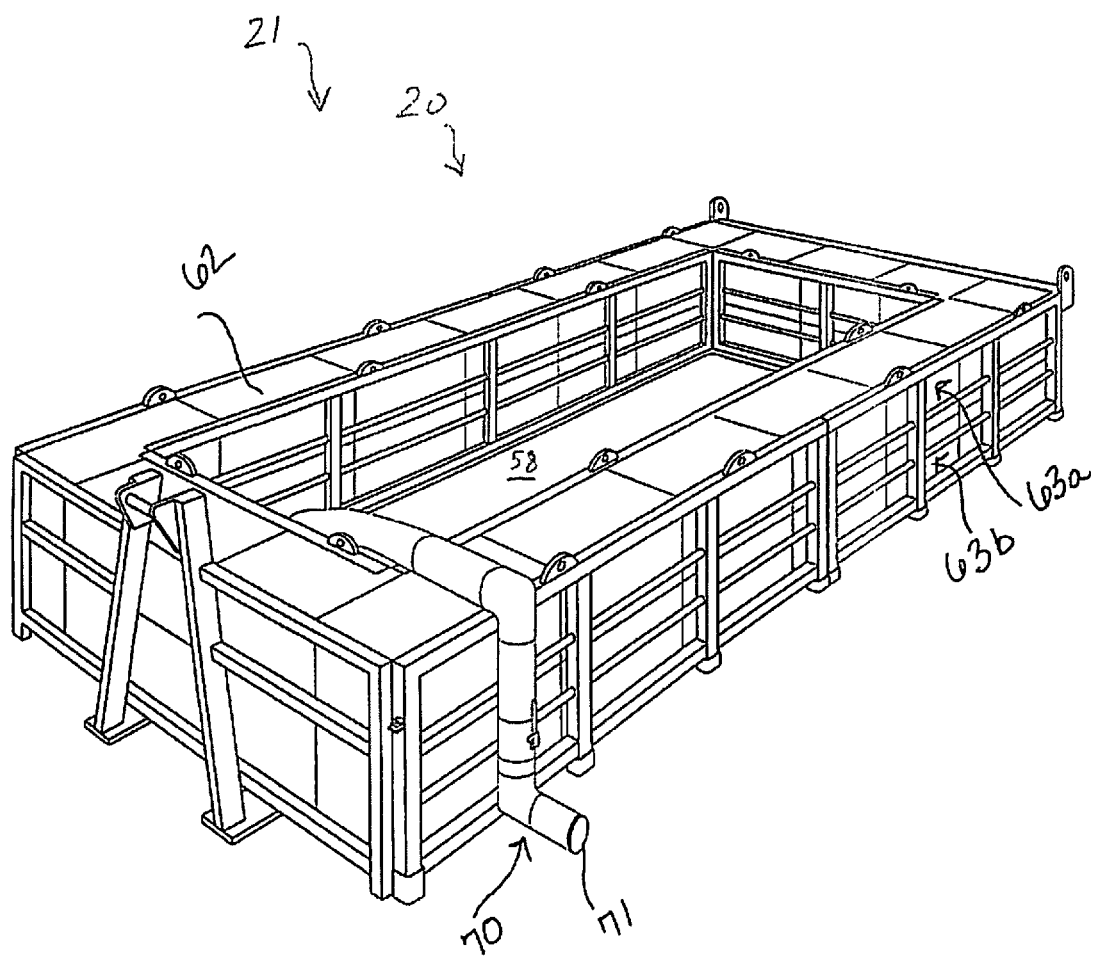
FIG. 8 is a perspective view of the system shown in FIG. 7.

As shown in FIG. 8, filter medium 60 comprises straw bales 62 positioned with a top layer of bales 63a located above and placed upon a bottom row of bales 63b. In one aspect a series of seven bales are placed end-to-end in the channel 50 along the vertical spans or columns of the margin 52 and along a perimeter of base 22, and two bales placed end-to-end in the channel 50 along the horizontal spans or rows of the margin 52 as shown. The two bales placed end-to-end in one aspect are flanked or covered by the bales positioned within the column aspect of the channel 50. Particularly, the bales 62 of straw are positioned and sometimes wedged between fence 30 and fence 40. The dimensions of a bale 62 in this example (i.e., "Example Bale") measure 34 inches (length) by 16 inches (width) by 14 inches (height). The bale 62 is placed on edge within channel 50 (with the 14 inch "height" dimension actually placed on edge (i.e., resting on the base 22) with the 16 inch "width" now spanning upward). Thus, a double stack or row of bales 63a, 63b will have a height measure of about 32 inches so that a portion of the bales extend upward past a top portion of segments 30, 40. The width of the channel 50 may be altered to accommodate for different dimensions of bales. Bales having different dimensions may also be used in the existing channel 50. In the present example, the width W (FIG. 4) of the channel is approximately 15.5 inches (measured on center from tube-to-tube (or from rail 49 to rail 39)). In one aspect the space clearance of width W is about 14 inches, which accommodates receipt of the bale 62 in a sideways or tipped-on-edge orientation. A typical bale 62 will include sections or flakes which may be severed or cut away from the balance of a bale 62. For instance, a bale may contain 3 to 4 flakes tied together. A user may sever one of the flakes away from the bale to shorten the length of the bale from 36 inches to 28 inches or other length corresponding to the removed flake. In this way a user may efficiently adjust the sizes of the bales 62 to fill the channel 50.

Figure 9:
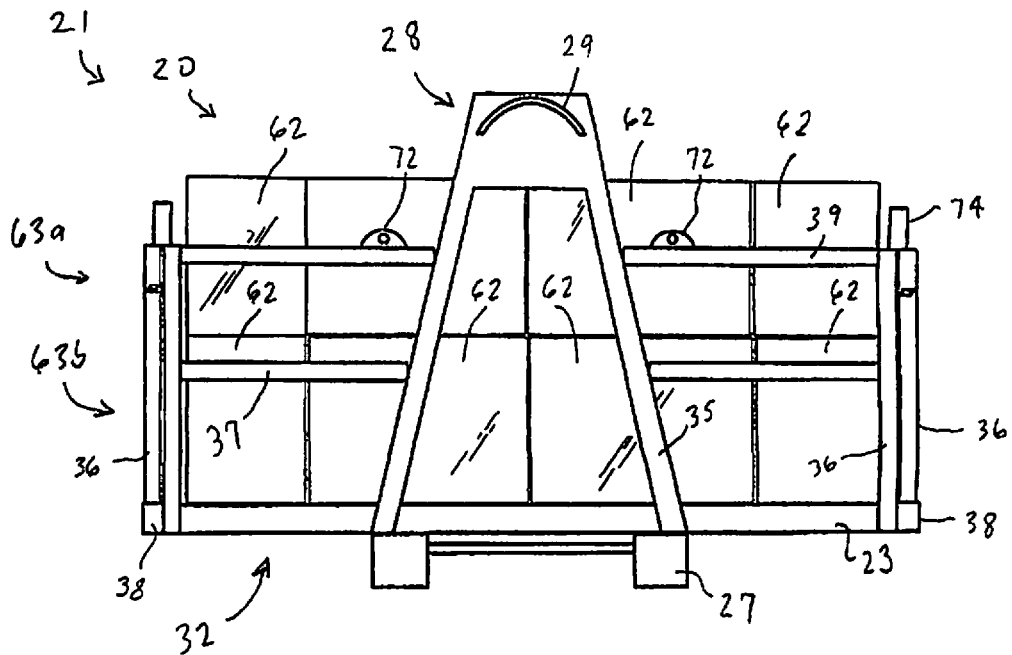
FIG. 9 is a front view of the system shown in FIG. 7.
Figure 10:
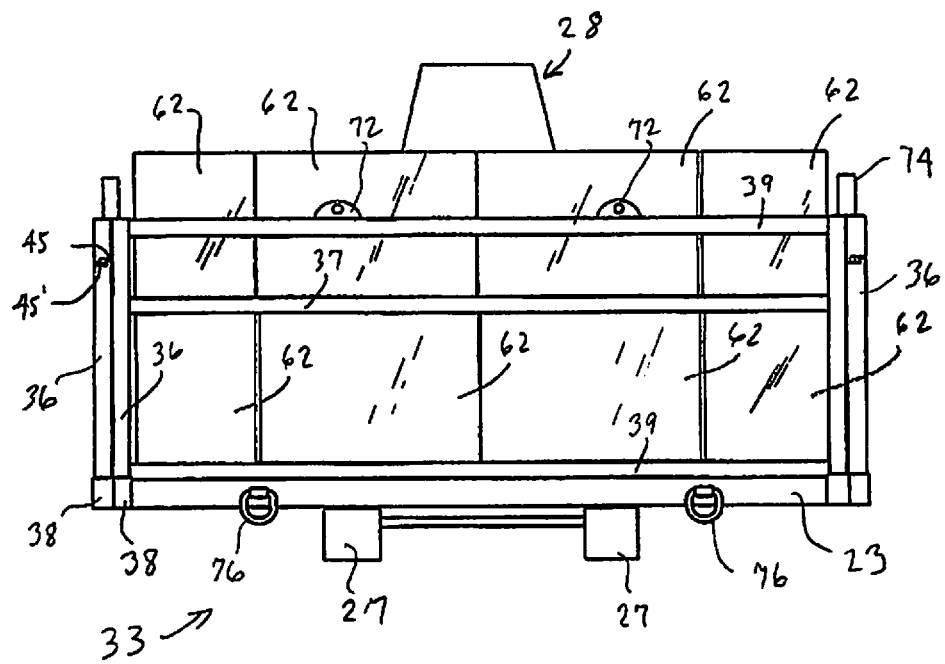
FIG. 10 is a rear view of the system shown in FIG. 7.

FIG. 9 shows a front view of sled 20 and system 21 containing representative bales such as Example Bales 62 made of straw. In this aspect the bales are shown to be positioned such that they extend above top rails 39 of sled 20. Such is the case where an Example Bale is used having a width dimension of 16 inches (standing on edge to create a double row height of approximately 32 inches above the base 22). FIG. 9 shows tongue 28 having arm bar 29 which is often curved or angled to assist receipt of a hydraulic lift arm. Base 22 in this example includes base rail 23 to which base segments 24 are connected. A rung 37 is positioned horizontally to connect angled struts 35 to posts 36. Lift eyes 72 are mounted to top rail 39. Posts 36 of front segment 32 are welded to base 22. Shown in this view are bales 62 forming top row 63a and bottom row 63b. In this example there are 8 bales shown. The four middle bales are inserted into the front row aspect channel 50 with the four outer bales inserted into the left and right column aspects of the channel 50. FIG. 10 shows a rear view of sled 20 and system 21. The rear or back segment 33 in this example is removable. The posts 36 insert into respective sockets 38. The top rail 39 is welded to posts 36; the middle rung or rungs 37 are also welded to posts 36. The lift eyes 72 can be used to easily lift back segment 33 out from sockets 38 and to also assist inlifting sled 20 when posts 36 are secured with pins within sockets 38. An additional or multiple posts 36 and respective sockets 38 may also be included as part of rear segment 33. Multiple rungs 37 may be used to provide further support of media placed in channel 50 about margin 52. Ears 45 are connected to the posts 36 of back segment 33 and to the posts 36 of segments 34 for convenient fastening of the respective segments. Top and bottom ears 45 may be used for enhanced connection. Quick release pins insert through respective ears 45, 45' for quick set-up and dismantling of respective segments 32, 33 and 34.

In assembly, the segments 34 of fence 30 are first installed, then the bales 62 positioned in the margin 52, and then the segments 44 of interior fence 40 assembled together and placed into position (and/or placed and assembled). Alternatively, the fence 40 is inserted and positioned within major internal area 31 prior to insertion of the bales 62. Fence 40 may be pushed against a vertical line of bales 62 to assure sufficient width W for the opposite channel 50 so that the opposite side of channel 50 may also receive a line of straw bales 62. In alternatives, fence 30 and fence 40 are positioned generally as shown, and bales 62 are dropped or set into the channel 50 along and throughout the margin 52. In a further aspect two bales 62 are positioned end-to-end within the channel 50 at opposite ends as shown, with two bales 62 positioned between the exterior front segment 32 and interior front segment 42, and two bales positioned between the back segment 33 and interior back segment 43. A series of 7 bales 62 may also be positioned at the opposite side of margin 52, thereby having a set of bales 62 extending completely around the channel 50 and filter bag 58. In one aspect the bales 62 are firmly pressed against each other within channel 50. As presented above, multiple rows, including a double row of bales 63a, 63b may be utilized within channel 50. Additional rows 63 may be included as needed. In the example shown in FIG. 7 and FIG. 8, a total of 18 "Example Bales" 62 comprise the first (top) row 63a and a total of 18 Example Bales comprise the second (bottom) row 63b, totaling 36 bales. Fewer or greater numbers of bales may be used. In one aspect bag 58 has dimension of approximately 54 inches wide by 15 feet long, and fits within minor internal area 41 without contacting fence 40. In other aspects where a wider sled 20 is used as noted below, bag 58 has a width of approximately 7 feet and length of 15 feet. Different size dimensions may be used.

In alternatives, sled 20 is widened such that a row of 3 bales 62 (even Example Bales, if desired) are positioned end-to-end opposite end rows of channel 50 with 7 bales aligned end-to-end along columns of channel 50. Such wider 3 bale structure allows for use of a larger filter bag 58 and larger filter medium 60 within the larger channel 50. In alternatives, 8 or more bales 62 (or 6 or fewer bales 62) may be placed end-to-end within channel 50 to accommodate different sizes of filter bags 58 and medium 60, and also to accommodate use of different sizes of sleds 20. A typical 7×2 bale configuration (i.e., accommodating an Example Bale 34×16×14 inch bales 62) allows for use of a sled 20 having an approved (even pre-approved) highway transportation width without having to obtain special transport permitting. In one aspect the sled 20 will have a total width of about 102 inches and a total length of about 263 inches.

When the filter bag 58 has been placed within fence 40 and connected to supply piping 70, and when filter medium 60, such as bales 62, has been installed within channel 50, operation of system 21 begins. Particularly, water to be dewatered is supplied to bag 58 via piping 70. Water inserted into bag 58 seeps through the filter medium of the filter bag 58 as filtrate. In alternatives the water may be forced through the filter medium. Left behind within the bag 58 is the "filtride". Filtride contains matter such as mud or sediment or fines or other material to be removed from the water. The water which seeps or exits from bag 58, i.e., the filtrate, passes through fence 40 and into filter medium 60 for a secondary containment or secondary filtration step. The filtrate passes through medium 60 and outward from fence 30. The secondary containment layer or filter (i.e., the filter medium 60) may also filter materials from the water. Over time the filter medium 60 will accumulate matter (filtrides) which eventually slow down the flow of water to the environment. At some point the filter medium 60 will need to be replaced with fresh medium (such as new straw bales) if and when the medium 60 clogs or deteriorates.

In alternatives, filter medium 60 includes filter socks or filter core logs 64, which include a filter material or membrane or a core of filter material. In one aspect a filter core log 64 has a diameter of 18 inches and 50 feet in length. A core log 64 or multiple core logs 64 are positioned within channel 50 and wrapped around the margin 52 to encircle filter bag 58. The core logs 64 may include special filter materials or membranes to further filter the exiting water and provide secondary containment of the undesired particles, pollutants or contaminants. Over time the core logs 64 may also become over-used or clogged, and then replaced with fresh core logs 64. The core logs 64, straw bales 62 and filter bag 58 may all be removed and disposed of as needed and according to disposal regulations. The straw bales 62 and logs 64 may be reused depending upon the amount of sediment captured at or within the bales 62 or logs 64. In cases where the dewatered water is very clean (i.e., contain minimal sediments or contaminants), the bales 62 or logs 64 may be used for several days or weeks or longer. For instance, if the sediment load is low, the medium 60 may not need to be replaced and remains in position for repeated use over long periods of time. This is the case even though the bales 62 or logs 64 are wet. When bales 62 get wet or soggy, they typically can't be moved, or moving them would cause them to tear or fall apart. With the present system, however, the portable sled 20 allows the medium 60 to be transported without having to separately lift the bales or logs or have them fall apart. In prior systems where the bales are placed on the ground, the bales would not be reusable, generally because the bales get wet and fall apart and could not be transported to another location for effective secondary containment.

A filter bag 58 with the present system 21 is also reusable. The bag 58 may be used at multiple locations because the sled 20 may be moved without the tearing of bag 58. Bags 58 typically do not have an internal or self-supporting structure to support being transported when containing materials or filtrides. When material is located within the bag 58, especially when bag 58 is also wet, the bag typically cannot be easily moved without tearing and spilling of the contents within the bag 58. Yet having the bag 58 placed on the base 22 allows for easy transportation and re-use of the bag 58 without the bag 58 breaking or tearing.

Figure 11:
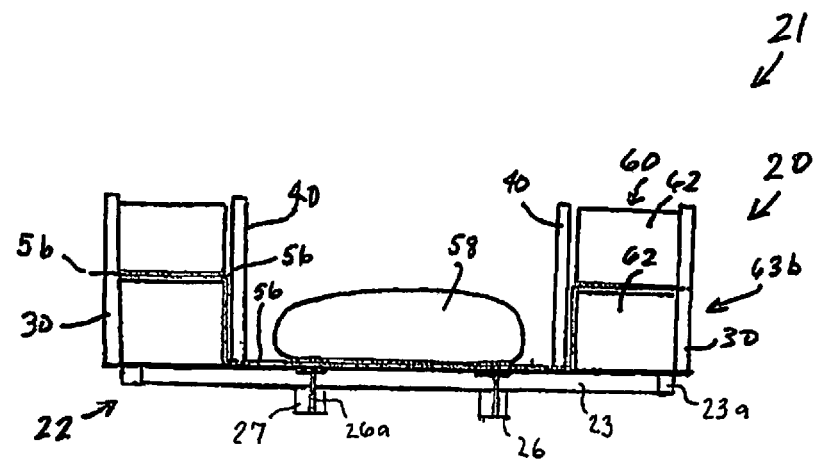
FIG. 11 is a cross-sectional view taken along line 11-11 of FIG. 7.
Figure 12:
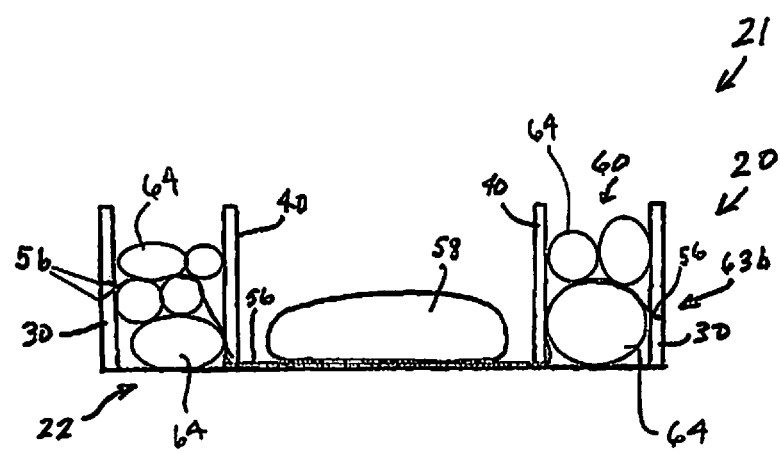
FIG. 12 is a partial cross-section view of a system using alternative filter media.
Figure 13:
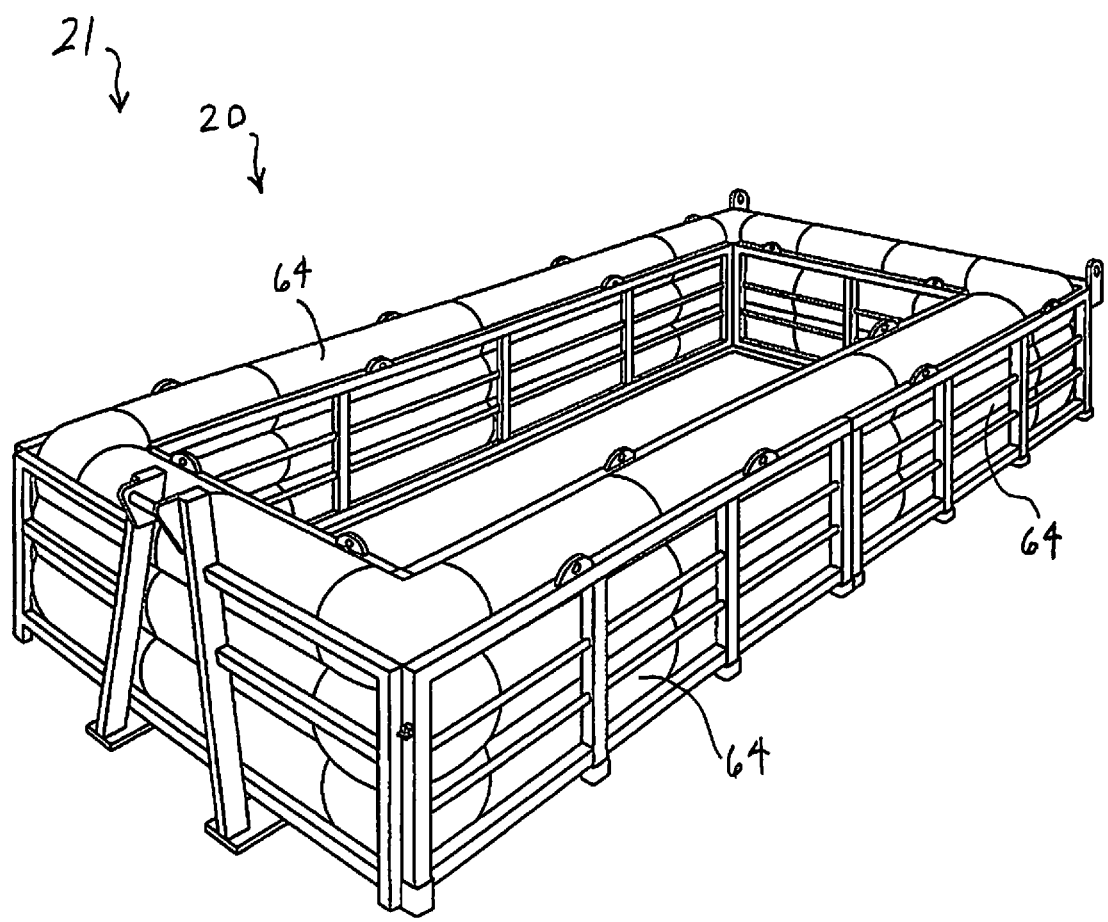
FIG. 13 is perspective view of the system shown in FIG. 7 having alternative media.

FIG. 11 is a cross-sectional view taken along line 11-11 of FIG. 7. Filter bag 58 is shown positioned upon base 22 within fence 40. Placed upon base 22 and positioned between base 22 and filter bag 58 is a liner sheet 56. In one aspect liner sheet 56 is a non-permeable sheet made of plastic or other material. In further aspects liner sheet 56 is permeable and/or made of a filter material to also provide a filtering of water that seeps from filter bag 58. In operation, water that exits from bag 58 will pool within fence 40 due to liner sheet 56, thereby causing the water to rise and travel to the level of sheet 56. The exiting water will pass through medium 60 (which may include straw bales 62 and/or filter logs or filter socks 64) and exit sled 20 at a top area of bottom row 63b. Depending on the volume of water and rate of displacement, the exiting water will fall or trickle from the area adjacent the liner sheet 56. Even where liner sheet 56 is permeable or semi-permeable, water exiting bag 58 will also tend to pool within fence 40 (depending on the rate of permeability of sheet 56). In alternatives, filter bag 58 has a height located above the liner sheet 56 at the junction of the top row and bottom row of bales 62 or logs 64. Sheet 56 is also positioned atop the bottom row 63b at the front segments 32, 42 and back segments 33, 43. In alternatives, no sheet 56 is utilized.

FIG. 10 is a cross-section view of a further aspect of the invention and showing use of filter core log 64 or several logs 64. A log 64 or filter sock or logs 64 containing filter core material a placed within channel 50 and wrap around the margin 52 and around bag 58. The logs 64 operate as secondary containment mechanisms. The logs 64 may be of the same or of different diameters and lengths. In one aspect a liner sheet 56 covers a bottom row of logs 64. The logs 64 will settle within the channel 50, conforming to the space. A variety of types of logs 64 may be used, having desired porosity and filtering characteristics. The logs 64 and bales 62 may be replaced when fresh medium 60 is needed or desired.

In further reference to FIG. 3, fence 30 includes lift eyes 72 positioned at a top portion of top rails 39b. Lift eyes 72 include a through hole configured to receive a pin or cable or strap to secure to a boom, hoist, crane or lift arm in order to pick-up fence 30, segments 34, apparatus 20 and/or system 21. The lift eyes 72 are positioned at various locations about the perimeter of fence 30. Cables or straps or pins insert into lift eyes 72 for convenient lifting and placement of sled 20. Fence 30 also includes lift arm 74 positioned at back segment 33. Lift arms 74 also include through holes configure to receive pins, cables, straps or other devices to lift segment 33 and sled 20. A series of lift rings 76 are connected to base 22 for lifting and/or sliding sled 20. Cables and/or straps or other mechanisms may insert into rings 76 (which hinge or rotate in some instances) for convenient lifting and placement of apparatus 20. The tongue 28 may also be used, alone or together with lift eyes, arms and rings, to transport sled 20, such as via lifting and/or rolling on or off a truck or lifting via hydraulic boom or crane. The forgoing lifting elements accommodate lifting and transport of sled 20 and system 21 when filter bag 58 is filled with material.

Figure 15:
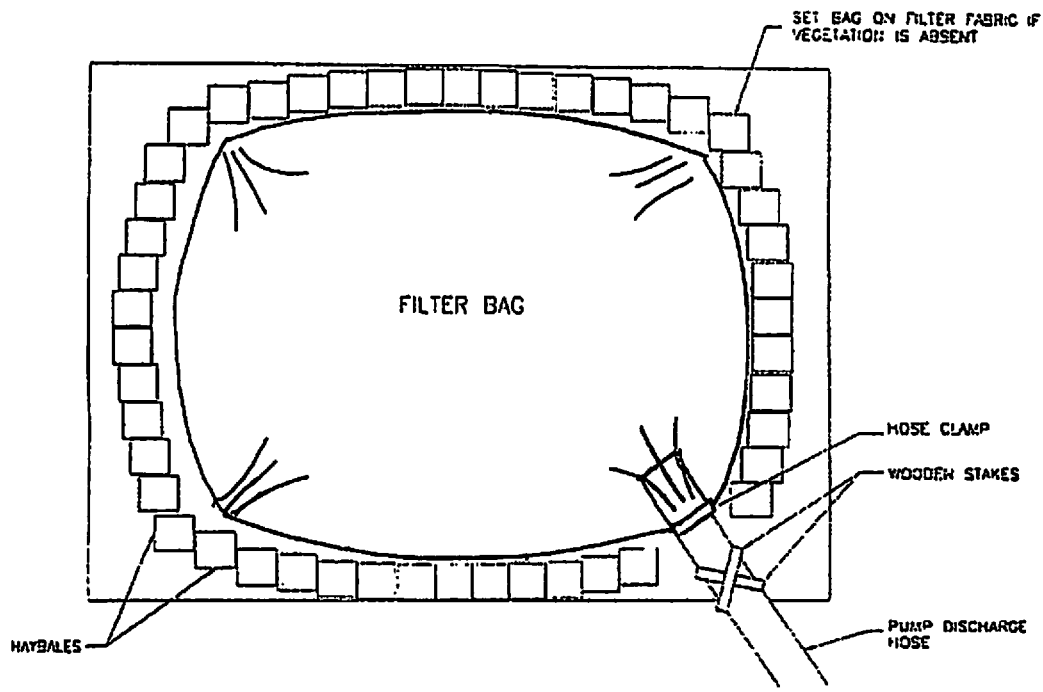
FIG. 15 is a top view of a prior art system for dewatering containing a filter bag surrounded by hay bales.
Figure 16:
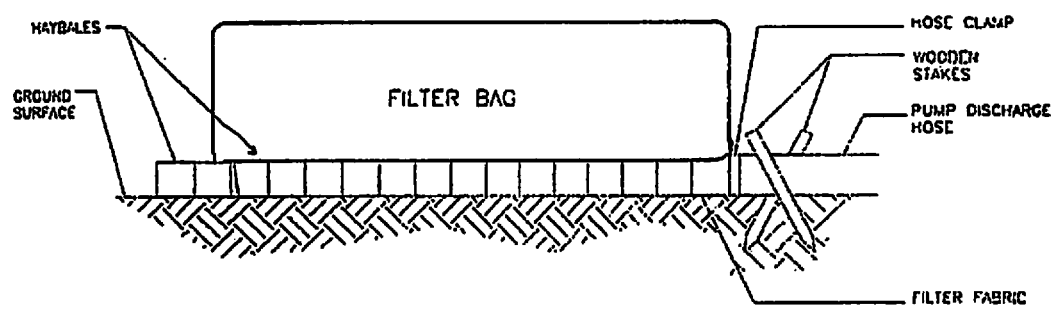
FIG. 16 is a section view of the system of FIG. 15.

In some operations, a system 21 will be positioned in a right-of-way of a construction site or other area. The filter bag 58 will receive a supply of water and capture particles, sand and/or unwanted matter or contaminants. The water will spill, generally or entirely by gravity, from apparatus 20 and travel to a desired retaining area, stream or other designated and appropriate location. In some instances, where the amount of water to be dewatered is relatively minor, the apparatus 20 and system 21 is reused. For instance, if a hole has been filled over night with rain water, pumping for 10 or 15 minutes may be sufficient to dewater the hole. Pumping the water via piping 70 to system 21 may be accomplished by setting apparatus 20 and system 21 into a convenient location near the hole (and within or external a designated right-of-way) in order to dewater the hole. The dewatering occurs using the primary and secondary containment aspects of system 21. When the pumping (dewatering) is completed within 10 to 15 minutes, for instance (or other durations as appropriate), system 21 is moved to a different location for further use. The filter bag 58 and/or filter medium 60 are reused (as appropriate). If the bag 58 is filled or near-filled, or if the filter medium 60 becomes filled or ineffective, the bag 58 and medium 60 may be replaced. The bag 58 and filter medium 60 remain in place during transport. Such portability and re-use greatly improves efficiency and lowers costs otherwise associated with having to create one-time use secondary containment solutions. For instance, as depicted in FIG. 15 and FIG. 16, one-time use solutions typically involve building a secondary containment layer of hay bales or other medium around a filter bag. Once the one-time use solution is completed, the filter bag is typically disposed of (not re-used, even if only slightly filled with filtrides) and the secondary containment layer (bales) either abandoned or dismantled (requiring reclamation of the containment area). The bales are typically too wet or soiled to be transported or reused. The bag is typically too flimsy to be moved for reuse. These one-time use efforts are time consuming and expensive.

With the present system 21, however, the apparatus is portable and conveniently configured to be picked and placed where needed. Multiple apparatuses 20 and systems 21 may also be used to quickly dewater a site so that construction may proceed efficiently. Moreover, management of dewatering operations is made more efficient using system 21 in terms of having to devote less planning and construction time to dewatering projects.

The present system 21 also extends the effective work day. Time devoted to preparing secondary containment for dewatering is now devoted to other construction tasks. Moreover, there is less concern during construction to assure proper landscaping to avoid pooling at the construction site. This is because the dewatering step is now more efficient. Rather than spending valuable time landscaping a site to avoid pooling of water (such as what might occur toward the end of a construction day), the construction may continue without the landscaping. This is because the pooled water can be efficiently removed the following day using the present system 21 for dewatering, if needed. If there is no overnight rain, for instance, there is no or little need to undertake the minor dewatering actions. Actions taken the prior day to prepare landscaping would be unnecessary. This allows the managers of the construction site increased flexibility on how to allocate labor and resources.

In alternatives, piping 70 includes quick connect components at a terminal end 71 of piping 70 to accommodate quick removal and quick connection of water source conduit or pumps. The terminal end 71 may also be configured with alternative size components to receive different size diameters of source conduit or pumps. Thus, when sled 20 is to be transported to a new location, the piping 70 is conveniently disconnected from the supply conduit or pumps which draw the water to be dewatered from the site. This allows filter bag 58 to remain within apparatus 20. Moreover, the external end of piping 70 is the position which quick-connects with the source piping. This preserves the portion of piping 70 which inserts into the bag 58 to minimize disrupting the seal between the piping 70 and bag 58. Typically a clamp or collar is applied to the piping 70 to secure the piping within the bag 58. It is best to avoid over-handling of the bag and piping to assure a continued seal.

In further aspects, jacks with alternative winches and ratchet mechanisms are provided at corners of the base 22 (or at other locations in order to level sled 20). A user may raise and lower various portions of the sled 22 to establish a generally flat orientation for the base 22 upon which filter bag 58 is positioned. Sled 20 may also include a removable axle so that wheels are added for ease of transport. Various mounts and hitch balls and pins are combined with tongue 28 or adjacent tongue 28 so that sled may be hitched to a truck (even a pickup truck) for transport. In this manner the sled 20 may be efficiently moved about different areas of a construction site for targeted dewatering.

Figure 14:
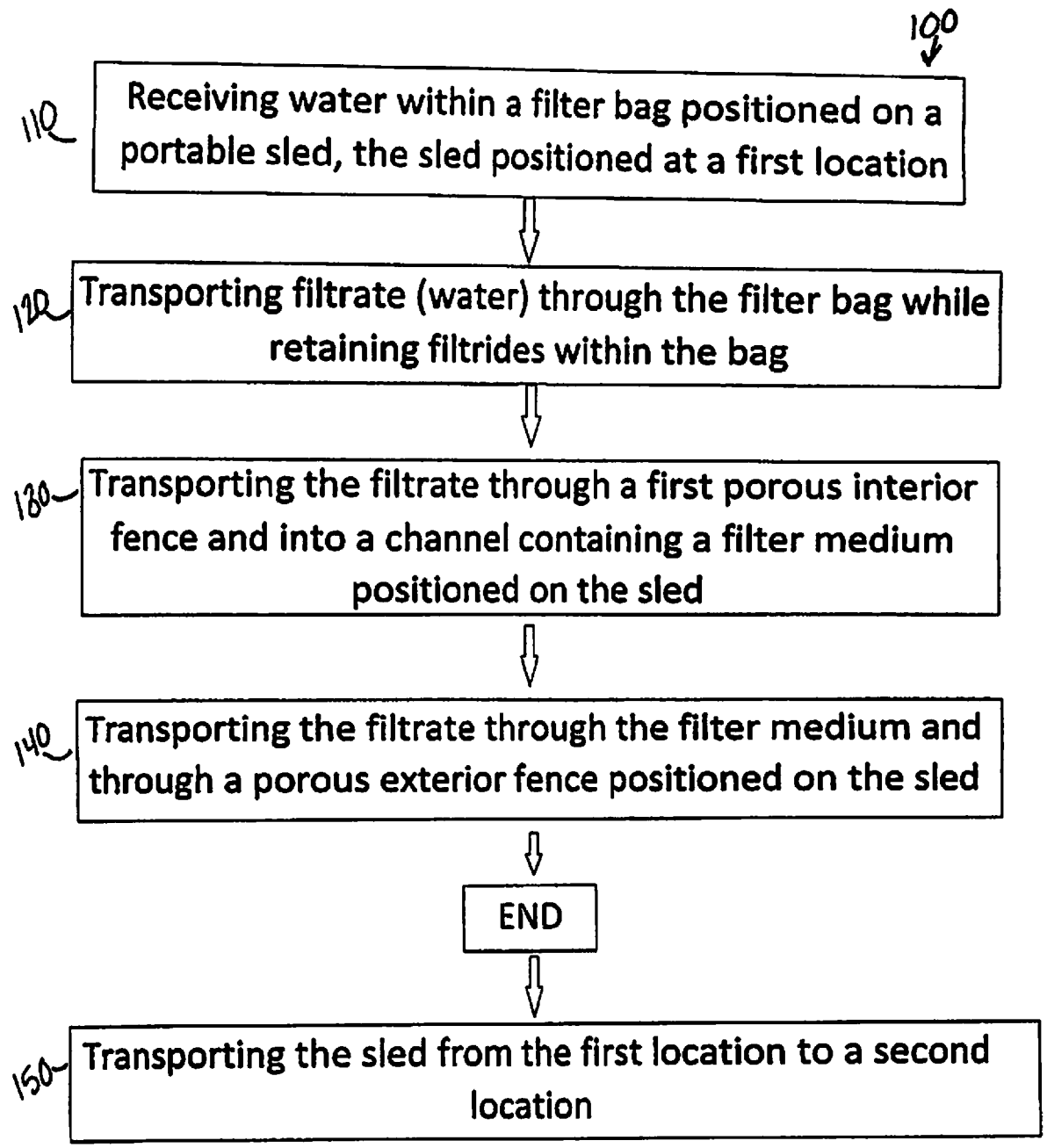
FIG. 14 is a flow diagram in accordance with a method aspect of the invention.

In a further aspect, the invention includes a method 100 of treating liquids while dewatering a site. FIG. 14 is a flow diagram in accordance with one aspect of the method. The method 100 includes a step 110 of receiving liquids such as water at a filter bag 58 positioned on a portable sled 20 at a first location. The receiving water step may be accomplished after pumping the water from the site to be dewatered using a pump and piping. The piping inserts into the filter bag 58 and is clamped into position. At step 120 the water (filtrate) is allowed to pass the filter bag 58 while filtrides are retained within the bag 58. The passing of the water is accomplished by use of gravity (naturally causing the water to pass through filter material comprising bag 58 and/or passing by use of pump pressure). For instance, a pump will force water into the bag 58 such that the force causes the water to seep through the bag 58 while contaminants or other material is retained in the bag 58 as filtrides. After the water exits the bag 58, the water may pool in an area around the bag 58 or travel by gravity action or by pressure causing the water to pass through a first porous interior fence 40. At step 130 the filtrate passes through the first porous interior fence 40 (for example by gravity) and into a channel 50 containing a filter medium 60. At step 140 the filtrate exits the filter medium 60 through a porous exterior fence 30 positioned on the portable sled 20. For example the filtrate exits by gravity. The water exits the sled 20 at multiple locations or areas around the perimeter of the sled 20. In one aspect the water spills over a first row of bales 63a. In an alternative aspect at step 150 the sled is transported from the first location to a second location. In one aspect such transportation is accomplished by retaining the filter bag 58 within the sled and re-using the filter bag 58 at the second location. The filter medium 60 is also retained within the channel 50 of sled 20 for reuse.

In further aspects the method includes replacing a filled or partially filled filter bag 58 (i.e., filled with filtrides). In some instances, where there are few or no contaminants in the water, the filter bag 58 need not be replaced frequently (it may be used until becoming full). An operator will observe whether the bag 58 is full or nearly full by observing the rate of flow of water being introduced into the bag 58. For instance, if the bag 58 is full or nearly full with filtrides, a supply pump will run under a greater pressure (due to the filled or relatively filed bag 58). A visual inspection of bag 58 may also indicate that it is full or nearly full, and a touching or pressing upon bag 58 by an operator may also demonstrate the bag is full or nearly full and needs to be removed and replaced. The filter bag 50 may fill swiftly depending on the amount of silt, particles, contaminant or other matter in the water and/or based on the material characteristics of the bag. Some filter bags will have less porosity and capture more filtrides compared to other types of varieties of filter bags.

The transporting step 150 may include placing the sled 20 upon a transport truck and subsequently placing the sled 20 at a second or subsequent location. The sled may be lifted via a hydraulic arm connecting with the tongue 28, or lifted by use of a hoist or crane. Sled 20 may also be transported by picking up sled at lift eyes 72 and/or lift arms 74 and/or lift rings 76. The sled 20 may also be transported by dragging. In other aspects the sled may be transported by use of an axle (fixed or removable) with wheels, and towed to a new location. A pickup truck may also be used to hitch to the sled 20 and transport the sled to different locations.

It should be understood, of course, that the foregoing relates to exemplary embodiments of the invention and that modifications may be made without departing from the spirit and scope of the invention as set forth in the following claims.

What is claimed is:

1. A portable water filtration apparatus, comprising:
    a sealed base such that water is not able to pass therethrough;
    an exterior fence extending upward from the base and bounding a major internal area, the exterior fence having openings to allow water to pass outward therethrough during operation; and
    an interior fence extending upward from the base and bounding a minor internal area, an entirety of the minor interior area oriented over the sealed base, the interior fence having openings to allow water to pass outward therethrough during operation, the exterior fence and the interior fence defining a filter medium placement channel in which is positioned a filter medium, a filter bag positioned within the minor internal area for capturing filtrides within the bag while allowing filtrate to pass through the bag, and piping for supplying water to the bag.

2. The filtration apparatus of claim 1 where the filter medium placement channel has a top opening through which the filter medium may pass.

3. The filtration apparatus of claim 2 where the filter medium placement channel forms a margin around the base.

4. The filtration apparatus of claim 3 where the channel has a uniform width of at last 14 inches.

5. The filtration apparatus of claim 4 where the channel defines a space to receive a first row of straw bales and a second row of straw bales stacked upon the first row of straw bales.

6. The filtration apparatus of claim 1 where the base has four sides and the exterior fence has segments extending along a perimeter of the base, at least two of the segments of the exterior fence being detachably connected to the base.

7. The filtration apparatus of claim 6 where at least one of the sides of the exterior fence includes fence segments, at least one of the fence segments having a post which inserts into a socket connected to the base.

8. The filtration apparatus of claim 1 where the interior fence includes 4 detachably connected fence segments, the interior fence slides freely upon the base while staying within the major internal area.

9. The filtration apparatus of claim 1 where the exterior fence comprises a series of spaced-apart outer posts connected to the base to allow water to pass between adjacent outer posts, and where the interior fence comprises a series of spaced-apart inner posts to allow water to pass between adjacent inner posts.

10. The filtration apparatus of claim 1 where the exterior fence comprises at least two opposing exterior fence segments, the base is a metal base extending between the at least two opposing exterior fence segments.

11. The filtration apparatus of claim 1 where the exterior fence and/or the interior fence further comprises top rails which include lift eyes having a through hole for receipt of a pin or cable or strap to secure to a boom, hoist, crane or lift arm in order to pick-up the exterior fence, interior fence or portable filtration apparatus.

12. A portable filtration system, comprising:
    a sealed metal base such that water is not able to pass therethrough;
    an exterior fence comprising spaced-apart outer posts connected to the base defining openings to allow water to pass outward between adjacent outer posts, the exterior fence bounding a major internal area;
    an interior fence comprising spaced apart inner posts defining openings to allow water to pass between adjacent inner posts, the interior fence positioned within the major internal area and bounding a minor internal area, and together with the base and the exterior fence, defines a filter medium placement channel to receive a filter medium, the channel wrapping around the minor internal area;
    a filter media positioned in the filter medium placement channel; and
    a filter bag positioned within the minor internal area to capture filtrides within the bag while allowing filtrate to pass through the bag.

13. The filtration system of claim 12 where the filter media includes at least one straw bale.

14. The filtration system of claim 12 where the filter media comprising a first filter medium layer bounding the minor internal area, the system further comprising a liner sheet positioned beneath the filter bag and covering the minor internal area and the first filter medium layer.

15. The filtration system of claim 12 where the exterior fence is positioned about a perimeter of the base, at least a pair of the outer posts removeably insertable into sockets connected to the base, horizontal structures spanning between the at least a pair of the outer posts thereby forming segments having sufficient structure to hold the filter media.

16. The filtration apparatus of claim 12 further comprising skids positioned below the base to allow the portable filtration apparatus to slide upon the ground or other surface.

17. The filtration apparatus of claim 12 where the exterior fence and/or the interior fence further comprises top rails and wherein the top rails further comprise lift eyes and include a through hole for receipt of a pin or cable or strap to secure to a boom hoist, crane or lift arm in order to pick-up any of the fences or portable filtration apparatus.

18. The filtration apparatus of claim 12 where the exterior fence includes a front fence segment rigidly connected to the base and having a lift tongue for lifting the portable filtration apparatus.

19. A portable filtration apparatus, comprising:
a sealed base such that water is not able to pass therethrough;
an exterior fence positioned about a perimeter of the sealed base and comprising a plurality of spaced-apart vertical posts connected to the sealed base and a plurality of horizontal structures spanning the distance between adjacent vertical posts thereby forming segments having sufficient structure to hold a filter media in place while also allowing liquids to pass outward between adjacent vertical posts, the exterior fence bounding a major internal area;
an interior fence extending from the sealed base and bounding a minor internal area comprising a plurality of spaced apart inner vertical posts and a plurality of horizontal rungs spanning the distance between adjacent inner vertical posts thereby forming segments allowing water to pass between adjacent vertical inner posts, the interior fence positioned within the major internal area and bounding a minor internal area, and together with the sealed base and the exterior fence, defining a filter medium placement channel for receipt of a filter mediation, the channel wrapping around the minor internal area;
a filter media positioned in the filter medium placement channel;
a filter bag positioned on the sealed base within the minor internal area for capturing filtrides within the bag while allowing filtrate to pass through the bag; and
a lift tongue is provided within a front segment of said exterior fence for lifting said portable filtration apparatus.

20. The filtration apparatus of claim 19 wherein the filter media includes at least one straw bale.

21. The filtration apparatus of claim 19 further comprising skids positioned below the sealed base to allow the portable filtration apparatus to slide upon the ground or other surface.

22. The filtration apparatus of claim 19 wherein the exterior fence and/or the interior fence further comprises top and/or bottom rails.

23. The filtration apparatus of claim 22 wherein the top rails further comprise lift eyes positioned at a top portion of said top rails and include a through hole for receipt of a pin or cable or strap to secure to a boom, hoist, crane or lift arm in order to pick-up any of the fences, segments, or portable filtration apparatus.

* * * * *